United States Patent
Yanagi et al.

(10) Patent No.: US 7,330,126 B2
(45) Date of Patent: Feb. 12, 2008

(54) POWER SUPPLY CONTROLLER

(75) Inventors: Kouji Yanagi, Tokyo (JP); Jun Fukazawa, Kanagawa (JP)

(73) Assignee: Fuji Film Co., Ltd, Kanagawa (JP)

( * ) Notice: Subject to any disclaimer, the term of this patent is extended or adjusted under 35 U.S.C. 154(b) by 351 days.

(21) Appl. No.: 11/191,068

(22) Filed: Jul. 28, 2005

(65) Prior Publication Data

US 2006/0022805 A1 Feb. 2, 2006

(30) Foreign Application Priority Data

Jul. 29, 2004 (JP) .............................. 2004-221596

(51) Int. Cl.
*G08B 21/00* (2006.01)
(52) U.S. Cl. ...................... 340/635; 340/660; 340/663; 340/146.2; 361/1
(58) Field of Classification Search ................ 340/635, 340/146.2, 660, 663, 657, 664; 361/1, 90, 361/91.3, 92
See application file for complete search history.

(56) References Cited

U.S. PATENT DOCUMENTS

| | | | | |
|---|---|---|---|---|
| 5,724,026 | A * | 3/1998 | Allen | 340/635 |
| 5,886,640 | A * | 3/1999 | Wang et al. | 340/635 |
| 5,905,439 | A * | 5/1999 | McIntyre | 340/664 |
| 6,271,759 | B1 * | 8/2001 | Weinbach et al. | 340/635 |
| 6,667,691 | B2 * | 12/2003 | Sapir | 340/635 |
| 6,909,372 | B2 | 6/2005 | Iwanaga et al. | |

FOREIGN PATENT DOCUMENTS

JP 2004-119516 A 4/2004

* cited by examiner

*Primary Examiner*—Anh V. La
(74) *Attorney, Agent, or Firm*—Birch, Stewart, Kolasch & Birch, LLP

(57) ABSTRACT

A power supply controller is used in a device including at least one component and at least one control board for controlling an operation of each component, and includes: a power supply section; and a power supply board for independently supplying a power supply voltage output from the power supply section to each of the component and the control board. The power supply board includes an output control circuit for independently controlling to output or to stop outputting the power supply voltage supplied from the power supply board to each of the components based on a signal indicating one of a normal state and an abnormal state of the power supply voltage used in each control board, which is fed back to the power supply board from each control board when the power supply voltage is supplied from the power supply board to each control board.

18 Claims, 11 Drawing Sheets

FIG. 3
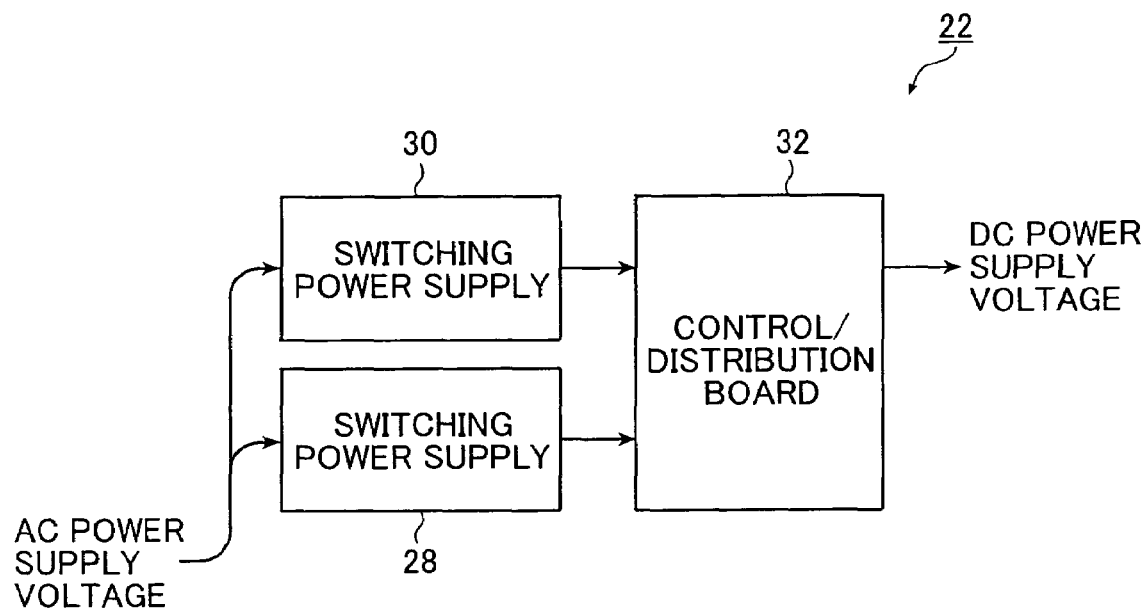
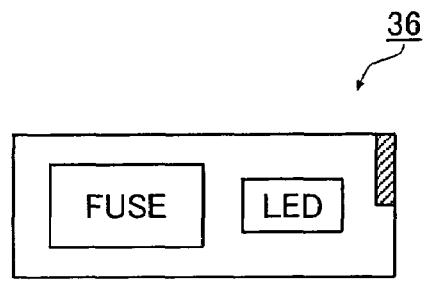
FIG. 5A
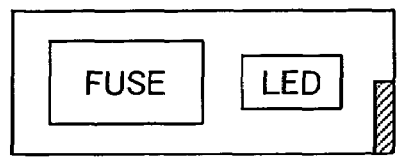
FIG. 5B
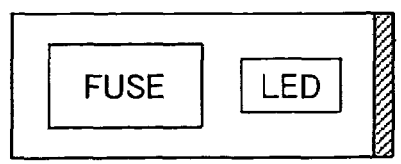
FIG. 5C

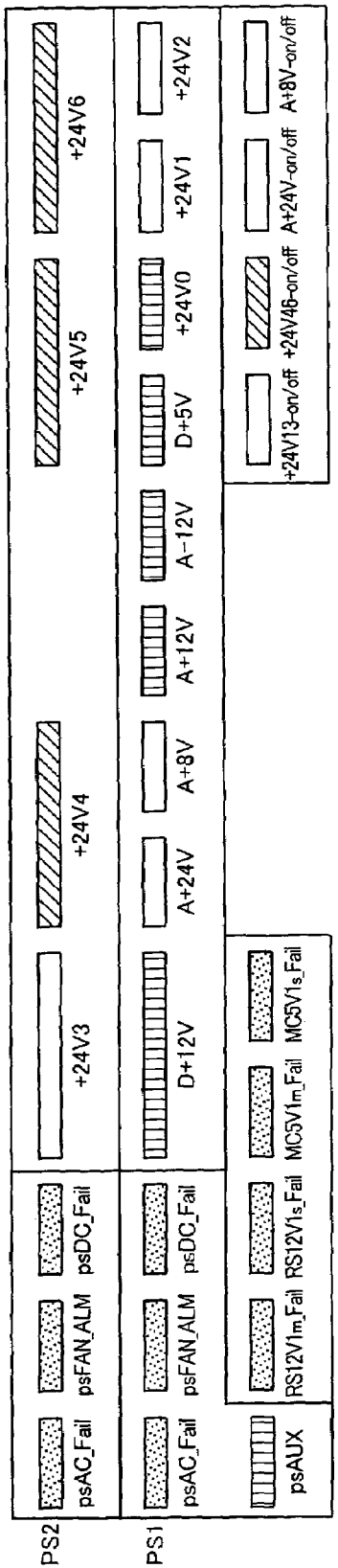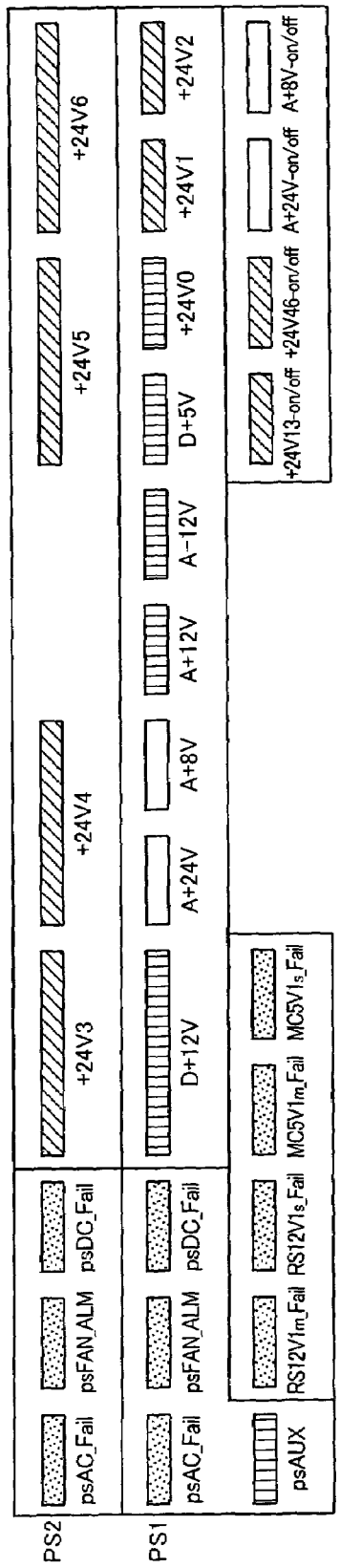

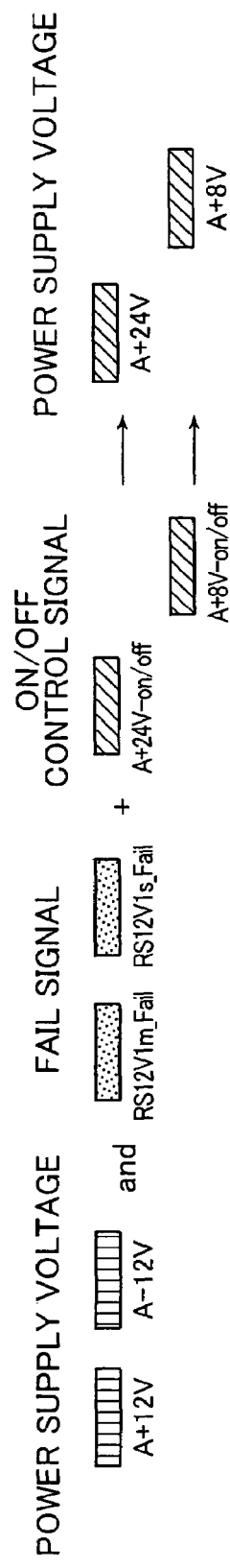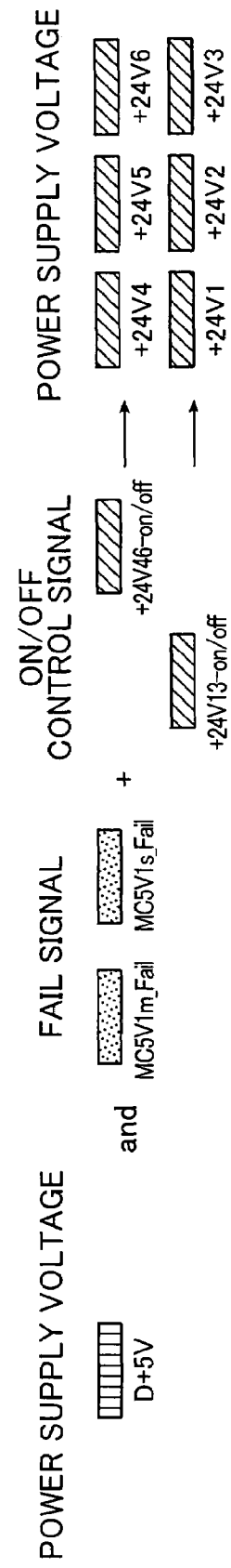

POWER SUPPLY CONTROLLER

The entire contents of literatures cited in this specification are incorporated herein by reference.

BACKGROUND OF THE INVENTION

The present invention relates to a power supply controller used in various devices including, for example, a photo printer for printing a picture on a recording medium (photographic paper).

As a safety measure for an occurrence of a failure in a power supply system of a device, a UPS (uninterruptible power supply) is mainly used. Specifically, when a failure occurs in a device including the UPS, a power supply is switched to the UPS so as to automatically shut the device down to prevent a malfunction and the like. However, since a photo printer such as a Minilab system has a large power capacity, the use of the UPS for the photo printer significantly increases cost. Therefore, the complete backup by the UPS has a limit.

Moreover, in some problems occurring in the power supply system, various situations sometimes occur in an unrepeated fashion. For example, if a failure such as an instantaneous blackout occurs in a power supply system of the above mentioned photo printer while photographic paper is being exposed to light with a laser light source, there is no guarantee that a printed image being developed on the photographic paper at that time is correctly output. As a result, if a photo print is passed to a customer while the occurrence of the failure in the power supply system remains unnoticed, such a problem is discovered only after the customer makes a compliant.

Moreover, it sometimes happens that a power supply system has a breakdown while a control system is normal. In contrast, there is a case where the control system has a breakdown while the power supply system is normal. The latter case induces a more serious problem in view of safety. In this case, a mechanical component in the device sometimes becomes out of control to cause runaway, thereby damaging the system.

Furthermore, the cause of a failure in a power supply system is difficult to identify. Therefore, in many cases, it takes a considerable time to determine the cause. For such a reason, when a failure occurs, a power supply device, a control board and the like considered to be the cause of a phenomenon at the occurrence of the failure are entirely replaced in most of the cases. Therefore, a task of a serviceman who replaces the components increases. Moreover, since the corresponding components are all replaced without identifying the cause of the failure, there arises another problem in that repair cost is disadvantageously increased.

On the other hand, a technique of using a software to self-diagnose a power supply system is known. According to this technique, after a device is powered ON, a software for self-diagnosis operating on the device is started to self-diagnose a power supply system to display the result of diagnosis on a display device such as a display. However, if a failure occurs in the power supply system, the device itself is not activated. Therefore, the cause of a failure in the power supply system cannot be identified in the self-diagnosis using a software.

As a conventional technique related to the technical field of the present invention, JP 2004-119516 A can be cited. JP 2004-119516 A relates to a power monitoring apparatus and the like for monitoring a failure in a power supply. JP 2004-119516 A discloses the following power monitoring apparatus. The power monitoring apparatus monitors a voltage fluctuation range of a power supply and a duration of voltage fluctuations within the voltage fluctuation range. The power monitoring apparatus looks up a voltage failure rank table for determining a voltage failure rank of the power supply to determine the power supply failure rank of the power supply based on the voltage fluctuation range and the duration obtained as the result of monitoring. The power monitoring apparatus sends a power supply failure signal indicating the thus determined power supply failure rank to a destination of the power supply voltage so as to efficiently implement the operation at the destination of the power supply voltage.

SUMMARY OF THE INVENTION

An object of the present invention is to solve the problems based on the above-described conventional techniques and to provide a power supply controller capable of preventing a component in a device from becoming out of control to cause runaway when a failure occurs in a power supply. Another object of the present invention is to provide a power supply controller capable of identifying the rough cause of the occurrence of a failure when the failure occurs in a power supply so as to reduce repair cost for the failure.

In order to achieve the above-described objects, the present invention provides a power supply controller used in a device including: at least one component; and at least one control board for controlling an operation of each of the at least one component, the power supply controller including: a power supply section; and a power supply board for independently supplying a power supply voltage supplied from the power supply section to each of the at least one component and each of the at least one control board, in which the power supply board includes an output control circuit for independently controlling to output and to stop outputting the power supply voltage supplied to each of the at least one component from the power supply board based on a signal indicating any one of a normal state and an abnormal state of the power supply voltage used in each of the at least one control board, the signal being fed back to the power supply board from each of the at least one control board when the power supply voltage is supplied to each of the at least one control board from the power supply board.

Here, it is preferred that the power supply board further include a first status indicator circuit operated by an auxiliary power supply voltage constantly output from the power supply section independently of the power supply voltage supplied from the power supply section, the first status indicator circuit being for indicating various statuses in the device, the statuses including a state of a signal indicating any one of a normal state and an abnormal state of the power supply voltage used in each of the at least one control board.

It is preferred that the first status indicator circuit indicate various statuses in the device in a different color for each of predetermined categories.

Moreover, it is preferred that the device be an image recording device including, as the at least one component: an exposure unit for exposing a recording medium to light in accordance with image data; at least one mechanical component unit including carrier means of the recording medium; and a developing unit for developing the recording medium exposed to light by the exposure unit, and including, as the at least one control board: an exposure control board for controlling an operation of the exposure unit; and at least one mechanical component control board for controlling an operation of each of the at least one mechanical component unit and the developing unit, the image recording device being for outputting a photo print obtained from an image in accordance with the image data recorded on the recording medium.

Moreover, it is preferred that each of the at least one control board include a power supply voltage generating circuit for generating an internal power supply voltage used in each of the at least one control board from the power supply voltage supplied from the power supply board, and each of the at least one control board feed back the internal power supply voltage and the power supply voltage supplied from the power supply board as the signal indicating any one of the normal state and the abnormal state of the power supply voltage.

It is preferred that the power supply board divide the power supply voltage supplied from the power supply section into a plurality of power supply voltages at various voltages so as to independently supply each of the plurality of power supply voltages at various voltages after the division to each of the at least one component and each of the at least one control board.

It is preferred that the power supply board further include a second status indicator circuit for indicating statuses of the plurality of power supply voltages at various voltages after the division.

It is preferred that the second status indicator circuit indicate the statuses of the plurality of power supply voltages at various voltages after the division in a different color for each of predetermined categories.

It is preferred that the second status indicator circuit include a plurality of light-emitting elements for emitting light of different colors, and emitted-light color information indicating an emitted-light color of each of the light-emitting elements even during extinction is written on a board of the second status indicator circuit.

It is preferred that the power supply board further include an ON/OFF control circuit, in which the ON/OFF control circuit controls to output and to stop outputting the power supply voltage supplied from the power supply section based on an ON/OFF control signal for controlling to output and to stop outputting the power supply voltage, the ON/OFF control signal being input from each of the at least one control board to the power supply board when the signal indicating any one of the normal state and the abnormal state of the power supply voltage indicates the normal state, whereas the ON/OFF control circuit stops outputting the power supply voltage supplied from the power supply section regardless of a state of the ON/OFF control signal when the ON/OFF control signal indicates the abnormal state.

It is preferred that each of the at least one control board include: a power supply ON/OFF control i/f circuit for outputting the ON/OFF control signal for controlling to output and to stop outputting the power supply voltage supplied from the power supply board to each of the at least one control board; and a power supply failure state detection circuit for detecting a failure in a power supply of each of the at least one control board to output the signal indicating any one of the normal state and the abnormal state of the power supply.

Furthermore, the present invention provides a power supply controller used in a device including: at least one component; and at least one control board for controlling an operation of each of the at least one component, the power supply controller including: a power supply section; and a power supply board for independently supplying a power supply voltage supplied from the power supply section to each of the at least one component and to each of the at least one control board, in which the power supply board includes a first status indicator circuit operated by an auxiliary power supply voltage constantly output from the power supply section independently of the power supply voltage supplied from the power supply section, the first status indicator circuit being for indicating various statuses in the device including a state of a signal indicating any one of a normal state and an abnormal state of the power supply voltage used in each of the at least one control board, the signal being fed back to the power supply board from each of the at least one control board when the power supply voltage is supplied to each of the at least one control board from the power supply board.

Here, it is preferred that the first status indicator circuit indicate various statuses in the device in a different color for each of predetermined categories.

Moreover, it is preferred that the device be an image recording device including, as the at least one component: an exposure unit for exposing a recording medium to light in accordance with image data; at least one mechanical component unit including carrier means of the recording medium; and a developing unit for developing the recording medium exposed to light by the exposure unit, and including, as the at least one control board: an exposure control board for controlling an operation of the exposure unit; and at least one mechanical component control board for controlling an operation of each of the at least one mechanical component unit and the developing unit, the image recording device being for outputting a photo print obtained from an image in accordance with the image data recorded on the recording medium.

It is preferred that the power supply board divide the power supply voltage supplied from the power supply section into a plurality of power supply voltages at various voltages so as to independently supply each of the plurality of power supply voltages at various voltages after the division to each of the at least one component and the at least one control board.

It is preferred that the power supply board further include a second status indicator circuit for indicating statuses of the plurality of power supply voltages at various voltages after the division.

It is preferred that the second status indicator circuit indicate the statuses of the plurality of power supply voltages at various voltages after the division in a different color for each of predetermined categories.

It is preferred that the second status indicator circuit include a plurality of light-emitting elements for emitting light of different colors, and emitted-light color information indicating an emitted-light color of each of the light-emitting elements even during extinction is written on a board of the second status indicator circuit.

BRIEF DESCRIPTION OF THE DRAWINGS

In the accompanying drawings:

FIG. 3 is a schematic block diagram showing an internal structure of the power supply controller;

FIGS. 5A to 5C are schematic diagrams, each showing a structure of a second status indicator circuit;

FIGS. 10A and 10B are schematic diagrams, each showing a display state in the first status indicator circuit;

FIGS. 12A and 12B are schematic diagrams showing a change of the display state in accordance with ON/OFF control signals output from the exposure control board and a mechanical control board, respectively, in the first status indicator circuit;

DETAILED DESCRIPTION OF THE PREFERRED EMBODIMENT

Hereinafter, a power supply controller according to the present invention will be described in detail based on a preferred embodiment illustrated in the accompanying drawings.

Figure 1:
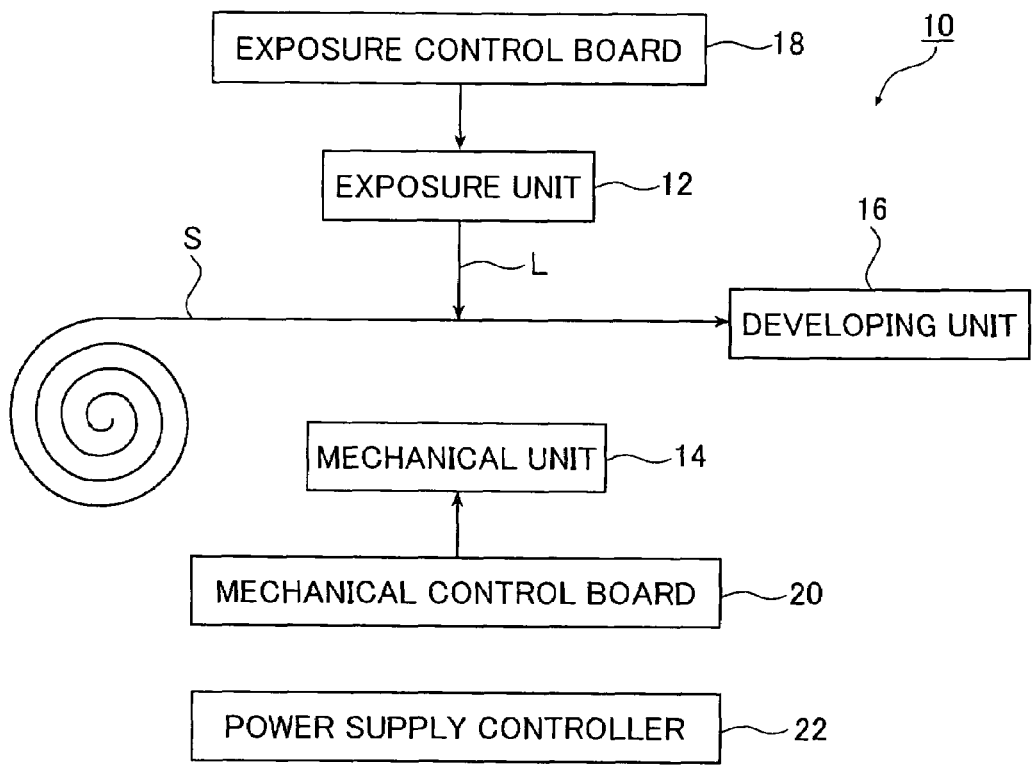
FIG. 1 is a schematic block diagram showing an internal structure of an image recording device for which a power supply controller according to an embodiment of the present invention is used.

FIG. 1 is a schematic block diagram showing an internal structure of an image recording device, for which a power supply controller according to an embodiment of the present invention is used. An image recording device 10 shown in FIG. 1 is a digital photo printer for recording an image in accordance with image data on a recording medium (photographic paper) S. The image recording device 10 includes as components: an exposure unit 12; a mechanical component unit (hereinafter, referred to simply as a mechanical unit) 14; and a developing unit 16. The image recording device 10 also includes as control boards: an exposure control board 18; and a mechanical component control board (hereinafter, referred to as a mechanical control board) 20, and further includes a power supply controller 22 according to the present invention.

The exposure unit 12 exposes the recording medium S to light in accordance with image data. In the case of this embodiment, the exposure unit 12 records an image in the following manner. The exposure unit 12 deflects three laser beams L emitted from three laser light sources corresponding to R (red) exposure, B (blue) exposure and G (green) exposure, which are modulated in accordance with image data in a main-scanning direction (a direction perpendicular to a paper plane of FIG. 1), so the three laser beams are incident on a predetermined recording position (an exposure position). As a result, the recording medium S being carried in a sub-scanning direction (in a direction from left to right in FIG. 1) approximately perpendicular to the main-scanning direction is two-dimensionally scanned and exposed to light so as to record an image (a latent image).

The mechanical unit 14 is a conceptual representation of all of various mechanical components present in each section in the image recording device 10. In the case of this embodiment, for example, the mechanical unit 14 includes: a carrier roller for carrying the recording medium S at predetermined timing to a predetermined position; carrier means for the recording medium S including a motor for driving the carrier roller and the like; various sensors; solenoids; and the like.

The developing unit 16 develops the recording medium S exposed to light by the exposure unit 12. In the case of this embodiment, the developing unit 16 performs processes such as color development, bleaching and fixing, washing, drying, and sorting on the recording medium S exposed to light by the exposure unit 12, on which the latent image is recorded, thereby obtaining a final print.

The exposure control board 18 controls an operation of the exposure unit 12 such as the amount of the laser beams L emitted from the laser light sources or an adjustment of a temperature of the laser light source. The mechanical control board 20 controls operations of the mechanical unit 14 and the developing unit 16.

The power supply controller 22 controls to output or to stop outputting a power supply voltage to each of the sections in the image recording device 10, which includes the exposure unit 12, the mechanical unit 14, the developing unit 16, the exposure control board 18, and the mechanical control board 20 described above. Each of the sections in the image recording device 10, which includes the exposure unit 12, the mechanical unit 14, the developing unit 16, the exposure control board 18, and the mechanical control board 20, is operated by a power supply voltage supplied from the power supply controller 22.

For image recording, the recording medium S is carried at the recording position to the sub-scanning direction at a predetermined speed by the mechanical unit 14 under the control of the mechanical control board 20. The recording medium S is two-dimensionally scanned and exposed to the light beams L deflected in the main-scanning direction by the exposure unit 12 under the control of the exposure control board 18, thereby recording a latent image on the recording medium S. The recording medium S, on which the latent image is recorded, is subjected to processes such as color development, bleaching and fixing, washing, drying, and sorting by the developing unit 16 under the control of the mechanical control board 20 to obtain a final print.

A specific structure of each of the exposure unit 12, the mechanical unit 14, and the developing unit 16 is not limited in any way, and therefore various structures can be employed. Similarly, a specific structure of each of the exposure control board 18 and the mechanical control board 20 is not limited in any way.

Moreover, for simplification of the description, only the exposure unit 12, the mechanical unit 14, the developing unit 16, the exposure control board 18, the mechanical control board 20, and the power supply controller 22 are conceptually illustrated in FIG. 1. However, the image recording device 10 may include various mechanical components, control boards, and the like other than those mentioned above. Moreover, the mechanical unit 14 may be divided into a plurality of mechanical subunit groups and a mechanical control board may be provided to control each of the mechanical subunit groups.

Next, the exposure control board 18 and the mechanical control board 20 will be described.

Figure 2:
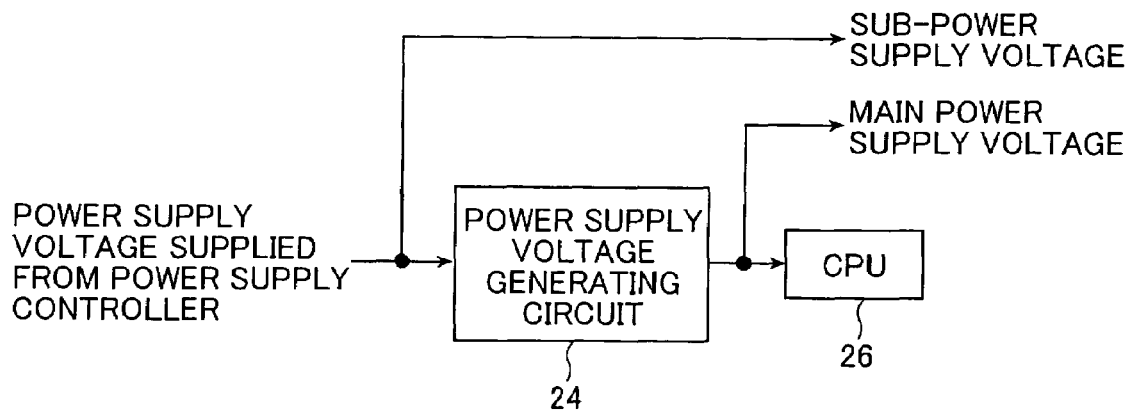
FIG. 2 is a schematic block diagram showing a structure regarding an internal power supply of an exposure control board.

FIG. 2 is a schematic block diagram showing a structure regarding an internal power supply of the exposure control board. For simplification of the description, only a power supply voltage generating circuit 24 and a CPU (central processing unit) 26 are shown in FIG. 2 as components of the exposure control board 18. In practice, however, the exposure control board 18 includes various components for controlling the operation of the exposure unit 12 in addition to the power supply voltage generating circuit 24 and the CPU 26.

The power supply voltage generating circuit 24 generates an internal power supply voltage used in the exposure control board 18 from the power supply voltage supplied from the power supply controller 22. The internal power supply voltage generated by the power supply voltage generating circuit 24 is supplied to the CPU 26, which is operated thereby. The CPU 26 is control means of controlling the operation of each of the sections in the exposure control board 18.

Moreover, as shown in FIG. 2, the internal power supply voltage output from the power supply voltage generating circuit 24 is output as a main power supply voltage, whereas the power supply voltage supplied from the power supply controller 22 is output as a sub-power supply voltage from the exposure control board 18. Each of the main power supply voltage and the sub-power supply voltage indicates a status of the power supply voltage in the exposure control board 18. As described below, both the main power supply voltage and the sub-power supply voltage are output from the exposure control board 18 as a fail signals (a self-diagnosis signals) for detecting a status of the power supply voltage in the exposure control board 18 so as to be fed back to the power supply controller 22.

Specifically, if the sub-power supply voltage is correctly fed back from the exposure control board 18 to the power supply controller 22, it can be determined that the power supply voltage is normally supplied from the power supply controller 22 to the exposure control board 18. If the main power supply voltage is correctly fed back from the exposure control board 18 to the power supply controller 22, it can be determined that the internal power supply voltage in the exposure control board 18 is normally generated, so the CPU 26, that is, the exposure control board 18 normally operates.

A specific structure of the power supply voltage generating circuit 24 is not limited in any way, and therefore various structures can be employed. A specific structure of the exposure control board 18 excluding the power supply voltage generating circuit 24 and the CPU 26 is no more limited, and therefore various structures can be employed.

A structure regarding the internal power supply voltage of the mechanical control board 20 is the same as that of the exposure control board 18 shown in FIG. 2. Therefore, the power supply controller 22 monitors the main power supply voltage and the sub-power supply voltage of the mechanical control board 20, which are fed back from the mechanical control board 20, thereby recognizing a power supply voltage status of the mechanical control board 20.

Next, the details of the power supply controller 22 shown in FIG. 1 will be described.

FIG. 3 is a schematic block diagram showing an internal structure of the power supply controller. As shown in FIG. 3, the power supply controller 22 includes: two switching power supplies 28 and 30 (PS1 and PS2) serving as power supply sections; and a control/distribution board 32 serving as a power supply board.

The switching power supplies 28 and 30 generate a plurality of DC (direct-current) power supply voltages at various voltages from an AC (alternating current) power supply voltage. In the case of this embodiment, an AC power supply voltage at 200V is supplied to the switching power supplies 28 and 30. As a result, the switching power supply 28 outputs DC power supply voltages +24V0 to +24V2, D+5V, D+12V, A+24V, A+8V, A+12V, and A−12V, whereas the switching power supply 30 outputs DC power supply voltages +24V3 to +24V6 (in total, 13-channel (ch) power supply voltages).

Herein, the reference symbols "D" and "A" of the DC power supply voltages indicate that these power supply voltages are used in a digital section and an analog section, respectively. Those power supply voltages are supplied to each of the sections in the image recording device 10. For example, the power supply voltages +24V5 and D+5V are supplied to the control/distribution board 32. The power supply voltages A+24V, A+8V, A+12V, and A−12V are supplied to the exposure control board 18, whereas the power supply voltage D+5V is supplied to the mechanical control board 20.

In the case of this embodiment, two switching power supplies 28 and 30 are used as the power supply sections. However, any number of switching power supplies equal to or larger than 1 may be used. Moreover, the power supply section is not limited to the switching power supply, and various power supplies may be used.

The control/distribution board 32 divides each of the plurality of DC power supply voltages supplied from the switching power supplies 28 and 30 into a plurality of power supply voltages so as to control to output or to stop outputting the plurality of power supply voltages at various voltages after the division of the power supply voltages. In the case of this embodiment, the control/distribution board 32 divides the 13-channel power supply voltages supplied from the switching power supplies 28 and 30 into 31-channel power supply voltages in total. The 31-channel power supply voltages obtained by the division are controlled to be output or stopped outputting to each of the sections in the image recording device 10.

The power supply voltages output from the power supply controller 22 are independently supplied to the respective blocks, for example, the exposure unit 12, the mechanical unit 14, the developing unit 16, the exposure control board 18, and the mechanical control board 20 (it is possible to output or to stop outputting a power supply voltage in an independent manner for each of the blocks). In the case of this embodiment, various mechanical components are conceptually referred to as the mechanical unit 14 as a whole. In practice, however, the power supply voltage is supplied to each of the groups of specific mechanical components in the mechanical unit 14. The same can be applied to the other components.

The control/distribution board 32 includes a first status indicator circuit 34 and a second status indicator circuit 36 as shown in FIGS. 4 and 5A to 5C.

Figure 4:
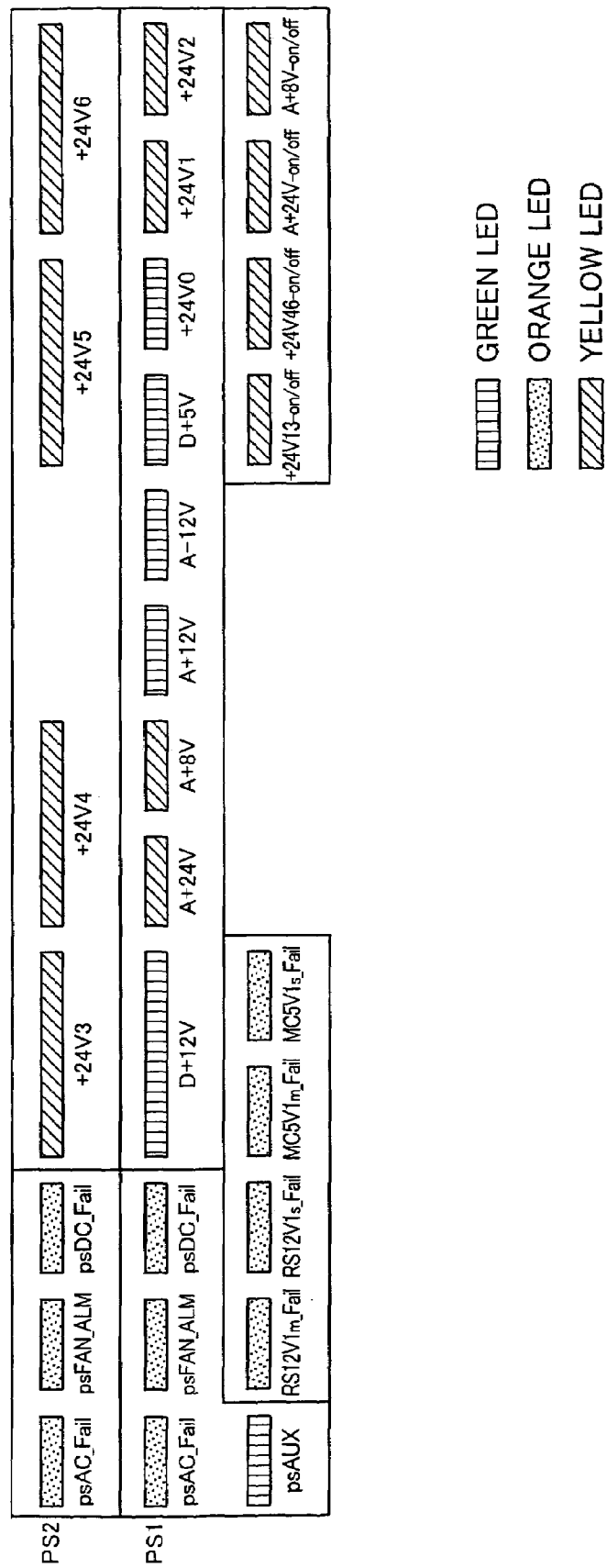
FIG. 4 is a schematic diagram showing a structure of a first status indicator circuit.

The first status indicator circuit 34 indicates statuses of the following signals as shown in FIG. 4, that is: fail signals of AC inputs (psAC_Fail), alarm signals of cooling fans (psFAN_ALM), fail signals of DC outputs (psDC_Fail), and an auxiliary power supply voltage (psAUX) of the switching power supplies 28 and 30 (PS1 and PS2); the 13-channel power supply voltages output from the switching power supplies 28 and 30 (+24V0 to +24V6, D+12V, D+5V, A+24V, A+8V, A+12V, and A−12V); the fail signals (the main power supply voltage (RS12V1m_Fail) and the sub-power supply voltage (RS12V1s_Fail)) fed back from the exposure control board 18; fail signals (the main power supply voltage (MC5V1m_Fail) and the sub-power supply voltage (MC5V1s_Fail)) fed back from the mechanical control board 20; and ON/OFF control signals supplied from the respective sections of the image recording device 10 including the exposure control board 18 and the mechanical control board 20 (+24V13-on/off, +24V46-on/off, A+24V-on/off, and A+8V-on/off).

The first status indicator circuit 34 includes a plurality of LEDs (light-emitting diodes) emitting different colors of light (in FIG. 4, the different light colors are indicated by different hatch patterns) in this embodiment. A green LED indicates an output status of each of the plurality of power supply voltages at various voltages output from the switching power supplies 28 and 30 and a status of the auxiliary power supply voltage. A lighted state indicates an output state, whereas an off state indicates an output stop state. An orange LED indicates a status of each of the AC inputs, cooling fans, and DC outputs of the switching power supplies 28 and 30 and a state of the power supply voltages of the exposure control board 18 and the mechanical control board 20. A lighted state indicates a normal state, whereas an off state indicates an abnormal state. A yellow LED indicates a status of each of the ON/OFF control signals and a DC output status of the switching power supplies 28 and 30 activated by the ON/OFF control signals. A lighted state indicates an ON/output state, whereas an off state indicates an OFF/output stop state.

As described above, various statuses in the image recording device 10 are indicated by changing the colors of light emitted from the LEDs for each of the categories. As a result, a serviceman has an advantage of easily recognizing a status of each of the components in the image recording device 10.

The second status indicator circuit 36 indicates statuses of the 31-channel power supply voltages obtained by the distribution of the 13-channel power supply voltages supplied from the switching power supplies 28 and 30 so as to be output through fuses, respectively.

In the case of this embodiment, the second status indicator circuit 36 includes a plurality of LEDs emitting different colors of light as in the case of the first status indicator circuit 34. For example, a green LED indicates a power supply voltage supplied to a predetermined section without condition after the application of an AC power supply voltage. A lighted state indicates an output state, whereas an off state indicates an output stop state. A yellow LED indicates a power supply voltage supplied in accordance with the status of the ON/OFF control signal. A lighted state indicates an output state, whereas an off state indicates an output stop state. A red LED indicates an interlock system power supply voltage. A lighted state indicates an output state. The red LED is turned off when a danger state such as where a front door is open is detected to stop the output.

On a board in the vicinity of the LEDs of the second status indicator circuit 36, emitted-light color information is written by silk-screen printing. In the case of this embodiment, if the emitted-light color information is located in the upper half of the LED as shown in FIG. 5A, it means the LED emits yellow light. If the emitted-light color information is located in the lower half of the LED as shown in FIG. 5B, it means the LED emits red light. If the emitted-light color information is located in both the upper and lower halves of the LED as shown in FIG. 5C, it means the LED emits green color. The emitted-light color information allows a color of light emitted from the LED to be identified even when the LED is turned off.

Although a plurality of LEDs emitting light of different colors such as green, orange, yellow, red and the like are used in the first and second status indicator circuits 34 and 36, the LEDs are not limited thereto. A single LED emitting light of a plurality of colors or a light-emitting element other than the LED can be used. It can be appropriately determined which information the first and second status indicator circuits 34 and 36 indicate. Moreover, a method of displaying the emitted-light color information in the second status indicator circuit 36 is not limited in any way, and therefore, various indication methods can be employed.

The number of power supply voltages output from the power supply section may be any number equal to or larger than 1. It is not essential for the power supply board to distribute the power supply voltages supplied from the power supply section. For example, the power supply board may only control to output or to stop outputting a plurality of power supply voltages supplied from the power supply section or may divide a single power supply voltage supplied from the power supply section into a plurality of power supply voltages so as to control to output or to stop outputting the plurality of power supply voltages obtained by the division. Specifically, any power supply board may be used as long as it can control to output or to stop outputting a plurality of power supply voltages independently supplied to the respective sections.

Next, a control system of the power supply controller 22 will be described.

Figure 6:
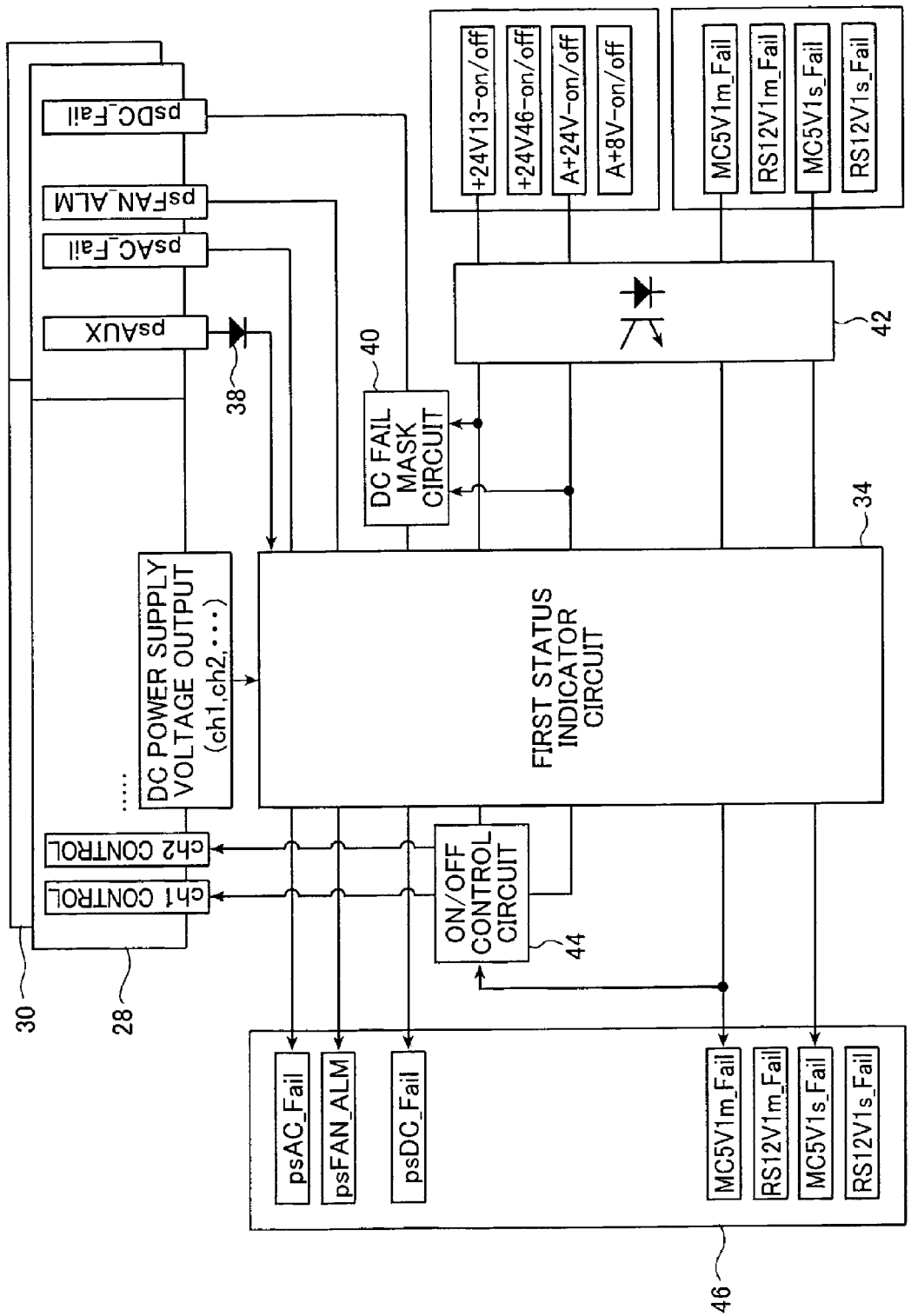
FIG. 6 is a conceptual diagram showing a control system of the power supply controller.

FIG. 6 is a conceptual diagram showing a control system of the power supply controller 22. As shown in FIG. 6, in addition to the auxiliary power supply voltage psAUX, the fail signal (an error signal) of the AC input psAC_Fail, the alarm signal of the cooling fan psFAN_ALM, and the fail signal of the DC output psDC_Fail are output from each of the switching power supplies 28 and 30.

The auxiliary power supply voltage psAUX is a power supply voltage that is constantly output independently of each of the DC power supply voltages output from the switching power supplies 28 and 30 when the AC power supply voltage is supplied to the switching power supplies 28 and 30. In the case of this embodiment, after a logical OR is performed on the auxiliary power supply voltages psAUX of the two switching power supplies 28 and 30 by a diode 38, the auxiliary power supply voltages psAUX are supplied to the first status indicator circuit 34. In other words, the auxiliary power supply voltages psAUX are supplied to the first status indicator circuit 34 without fail as long as the AC supply voltage is supplied unless two switching power supplies are broken at the same time.

Therefore, since the auxiliary power supply voltages psAUX are constantly supplied to the first status indicator circuit 34, the first status indicator circuit 34 is capable of indicating the statuses of the switching power supplies 28 and 30 even if a failure occurs to stop the output of all power supply voltages from the switching power supplies 28 and 30. Therefore, a serviceman can identify the rough cause of the occurrence of the failure. Accordingly, since only the control board or the mechanical component corresponding to the rough cause is required to be replaced, the task of the serviceman reduces, thereby reducing the repair cost.

Moreover, the fail signal of the AC input psAC_Fail is a signal output in the case where a failure such as a drop of an input voltage occurs in the AC power supply voltage supplied to each of the switching power supplies 28 and 30. The alarm signal of the cooling fan psFAN_ALM is a signal output in the case where the rotation of the cooling fan provided in each of the switching power supplies 28 and 30 is stopped. The fail signal of the DC output psDC_Fail is a signal output in the case where a failure such as a voltage drop of the DC power supply voltage output from each of the switching power supplies 28 and 30 occurs.

The fail signals of the AC input psAC_Fail and the alarm signals of the cooling fan psFAN_ALM may perform logical control, for example, a logical AND/OR, on the fail signals and the alarm signales respectively output from the switching power supplies 28 and 30 as needed. The above-mentioned signals are input to the first status indicator circuit 34 which in turn indicates the statuses of the signals.

On the other hand, the fail signals of the DC outputs psDC_Fail similarly perform logical control on the fail signals output from the respective DC output channels of the switching power supplies 28 and 30 while being supplied to a DC fail mask circuit 40. The DC fail mask circuit 40 invalidates the fail signals of the DC outputs psDC_Fail because the fail signals of the DC outputs psDC_Fail output from the switching power supplies 28 and 30 are not abnormal when the ON/OFF control signals are in an OFF state, that is, when the output of the DC power supply voltages from the switching power supplies 28 and 30 is stopped. In other words, only when the ON/OFF control signals are in an ON state, that is, only when the DC power supply voltages are output from the switching power supplies 28 and 30, the DC fail mask circuit 40 validates the fail signals of the DC outputs psDC_Fail.

After the fail signals of the DC outputs psDC_Fail are masked (that is, set to be validated or invalidated) by the DC fail mask circuit 40, the fail signals psDC_Fail are input to the first status indicator circuit 34 which in turn indicates the statuses of the fail signals.

In the case of this embodiment, the fail signals and the ON/OFF control signals are output from the exposure control board 18 and the mechanical control board 20. Although omitted for simplification of the description, the above signals are also output from each of the sections in the image recording device 10.

As already described above, the fail signals output from the exposure control board 18 and the mechanical control board 20 are self-diagnostic signals fed back from each of these control boards to the control/distribution board 32, respectively. Each of the fail signals is composed of the DC power supply voltage (the sub-power supply voltage) supplied from the control/distribution board 32 to each of the control boards and the internal power supply voltage (the main power supply voltage) generated in each of the control boards. That is, each of the fail signals indicates a normal state or an abnormal state of the power supply voltage on the side of each of the control boards.

In the case of this embodiment, the fail signal RS12V1m_Fail indicating a status of the main power supply voltage of the exposure control board 18 and the fail signal RS12V1s_Fail indicating a status of the sub-power supply voltage thereof are output from the exposure control board 18 so as to be input to the control/distribution board 32. On the other hand, the fail signal MC5V1m_Fail indicating a status of the main power supply voltage of the mechanical control board 20 and the fail signal MC5V1s_Fail indicating a status of the sub-power supply voltage thereof are output from the mechanical control board 20 so as to be input to the control/distribution board 32.

Each of the fail signals RS12V1m_Fail, RS12V1s_Fail, MC5V1m_Fail, and MC5V1s_Fail is input to the first status indicator circuit 34 through a photocoupler 42.

The ON/OFF control signal is a signal for controlling to output or to stop outputting the DC power supply voltage from each of the switching power supplies 28 and 30. If the ON/OFF control signal is in an ON state, the DC power supply voltage of a corresponding channel (ch) is output from the switching power supply 28 or 30. On the other hand, if the ON/OFF control signal is in an OFF state, the output of the DC power supply voltage of a corresponding channel from the switching power supply 28 or 30 is stopped.

In the case of this embodiment, the ON/OFF control signal A+24V-on/off for controlling to output or to stop outputting the power supply voltage A+24V and the ON/OFF control signal A+8V-on/off for controlling to output or to stop outputting the power supply voltage A+8V are output from the exposure control board 18 so as to be input to the control/distribution board 32. Similarly, the ON/OFF control signal +24V13-on/off for controlling to output or to stop outputting the power supply voltages +24V1 to +24V3 and the ON/OFF control signal +24AV46 -on/off for controlling to output or to stop outputting the power supply voltages +24V4 to +24V6 are output from the mechanical control board 20 so as to be input to the control/distribution board 32.

As in the case of the fail signals, the above-mentioned ON/OFF control signals A+24V-on/off, A+8V-on/off, +24V13-on/off, and +24AV46-on/off are input through the photocoupler 42 to the first status indicator circuit 34 which in turn indicates the statuses of these signals.

Then, the ON/OFF control signals A+24V-on/off, A+8V-on/off, +24V13-on/off and +24AV46-on/off, and the fail signals RS12V1m_Fail and MC5V1m_Fail indicating the statuses of the main power supply voltages are further input from the first status indicator circuit 34 to the ON/OFF control circuit 44. If the fail signals RS12V1m_Fail and MC5V1m_Fail indicate a normal state, the ON/OFF control circuit 44 controls to output or to stop outputting the DC power supply voltages output from the switching power supplies 28 and 30 based on the ON/OFF control signals A+24V-on/off, A+8V-on/off, and +24V13-on/off and +24AV46-on/off, respectively. On the other hand, if the fail signals RS12V1m_Fail and MC5V1m_Fail indicate an abnormal state, the ON/OFF control circuit 44 stops outputting the DC power supply voltages output from the switching power supplies 28 and 30 regardless of statuses of the ON/OFF control signals A+24V-on/off, A+8V-on/off, and +24V13-on/off and +24AV46-on/off (forces the ON/OFF controls signals into an OFF state).

The switching power supplies 28 and 30 respectively receive the ON/OFF control signals A+24V-on/off, A+8V-on/off, and +24V13-on/off and +24AV46-on/off from the ON/OFF control circuit 44 so as to output or to stop outputting the DC power supply voltages of corresponding channels (chs). The DC power supply voltages output from the switching power supplies 28 and 30 are input to the first status indicator circuit 34 which indicates the statuses of these DC power supply voltages. The DC power supply voltages output from the switching power supplies 28 and 30 are distributed in the control/distribution board 32 as needed so as to be supplied through the fuses to the respective sections in the image recording device 10 including the exposure unit 12, the mechanical unit 14, the developing unit 16, the exposure control board 18, and the mechanical control board 20, respectively.

The fail signals of the AC inputs psAC_Fail, the alarm signals of the cooling fans psFAN_ALM, and the fail signals of the DC outputs psDC_Fail, the fail signals of the power supply voltages of the exposure control board 18, RS12V1m_Fail and RS12V1s_Fail, and the fail signals of the power supply voltages of the mechanical control board 20, MC5V1m_Fail and MC5V1s_Fail, described above are further supplied from the first status indicator circuit 34 to a main control board 46. The main control board 46 receives the above-described fail signals so as to perform various processes of displaying information about the contents of a failure on a display device such as a display, transmitting information about the contents of a failure through a network, shutting the image recording device 10 down, and the like, based on the received fail signals.

Next, a circuit of an interface area between the exposure control board 18 and the control/distribution board 32 will be described giving a specific example thereof.

Figure 7:
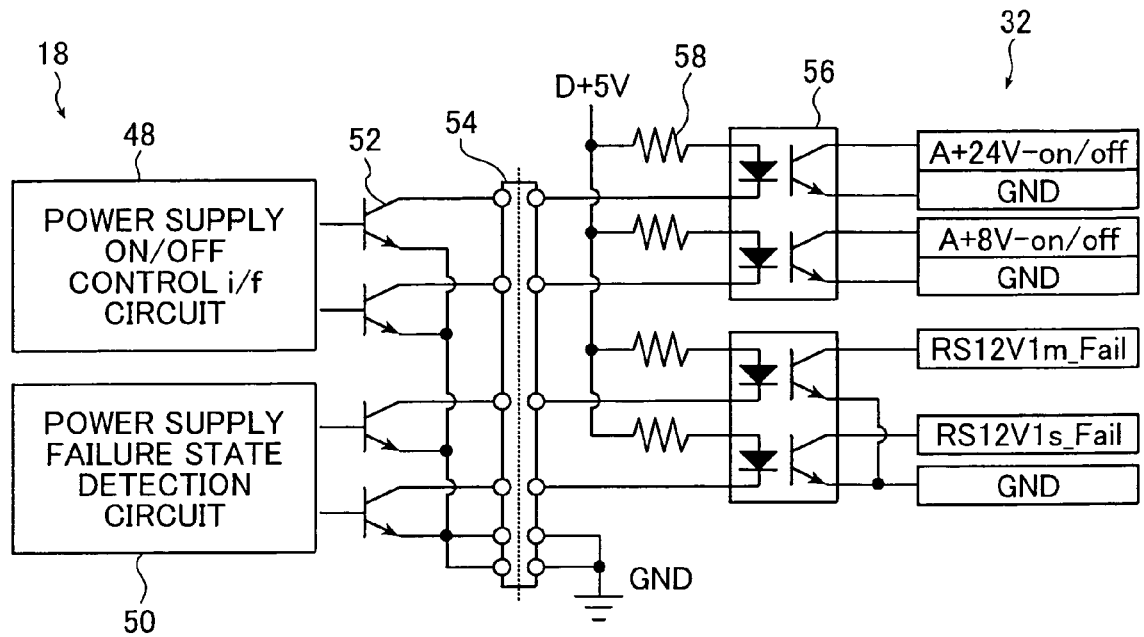
FIG. 7 is a circuit diagram showing an interface area between the exposure control board and a control/distribution board of the power supply controller.

FIG. 7 is a circuit diagram showing an interface area between the exposure control board and the control/distribution board of the power supply controller. As shown in FIG. 7, the exposure control board 18 includes: a power supply ON/OFF control i/f (interface) circuit 48 for controlling to output or to stop outputting the power supply voltages A+24V and A+8V supplied from the control/distribution board 32 to the exposure control board 18; and a power supply failure state detection circuit 50 for detecting a failure of the power supply (the main power supply voltage and the sub-power supply voltage) in the exposure control board 18.

In the exposure control board 18, each of signals output from the power supply ON/OFF control i/f circuit 48 and the power supply failure state detection circuit 50 is input to a base of each of bipolar transistors 52 serving as output drivers. Emitters of all the bipolar transistors 52 are short-circuited. The short-circuited emitters and collectors of the respective bipolar transistors 52 are connected to corresponding terminals of the control/distribution board 32 through a connector 54. Alternatively, photocouplers may be used in place of the bipolar transistors 52.

On the other hand, in the control/distribution board 32, a terminal corresponding to the emitters of all the bipolar transistors 52 of the exposure control board 18 is connected to a ground GND. Each of terminals corresponding to the collectors of each of the bipolar transistors 52 is connected to the power supply voltage D+5V through each of the photocouplers 56 and resistor elements 58. From the photocoupler 56 corresponding to the power supply ON/OFF control i/f circuit 48, the ON/OFF control signals A+24V-on/off and A+8V-on/off are output. On the other hand, from the photocoupler 56 corresponding to the power supply failure state detection circuit 50, the fail signals RS12V1m_Fail and RS12V1s_Fail are output.

For example, when a signal corresponding to the ON/OFF control signal A+24V-on/off, which is output from the power supply ON/OFF control i/f circuit 48, is brought to a low level, the bipolar transistors 52 corresponding to this signal are brought into an OFF state. Accordingly, the photocoupler 56 corresponding to the signal output from the power supply ON/OFF control i/f circuit 48 is also turned OFF state. Therefore, the ON/OFF control signal A+24V-on/off is pulled up by a pull-up resistor (not shown) to be at a high level.

On the other hand, when the signal corresponding to the ON/OFF control signal A+24V-on/off, which is output from the power supply ON/OFF control i/f circuit 48, is brought to a high level, the bipolar transistors 52 corresponding to this signal are brought into an ON state. Accordingly, the photocoupler 56 corresponding to the signal output from the power supply ON/OFF control i/f circuit 48 is also turned ON state. Therefore, the ON/OFF control signal A+24V-on/off is connected to the ground GND to be at a low level.

As described above, the photocouplers 56 are used to achieve open collector connection on the board of the signal reception side. As a result, a failure, for example, the disconnection of a connector for connecting the boards to each other or the breaking of a cable can be detected.

Although the operation of the circuit, which corresponds to the ON/OFF control signal A+24V-on/off, has been described above, the circuit operates in the same manner for the ON/OFF control signal A+8V-on/off and fail signals RS12V1m_Fail and RS12V1s_Fail. Moreover, although the interface area between the exposure control board 18 and the control/distribution board 32 has been described as an example, the same circuit configuration can also be used for a connecting state between the boards, including the connection between the control/distribution board 32 and the mechanical control board 20.

Next, an operation of the power supply controller 22 upon activation will be described together with a display state of the first status indicator circuit 34, giving an example thereof.

Figure 8:
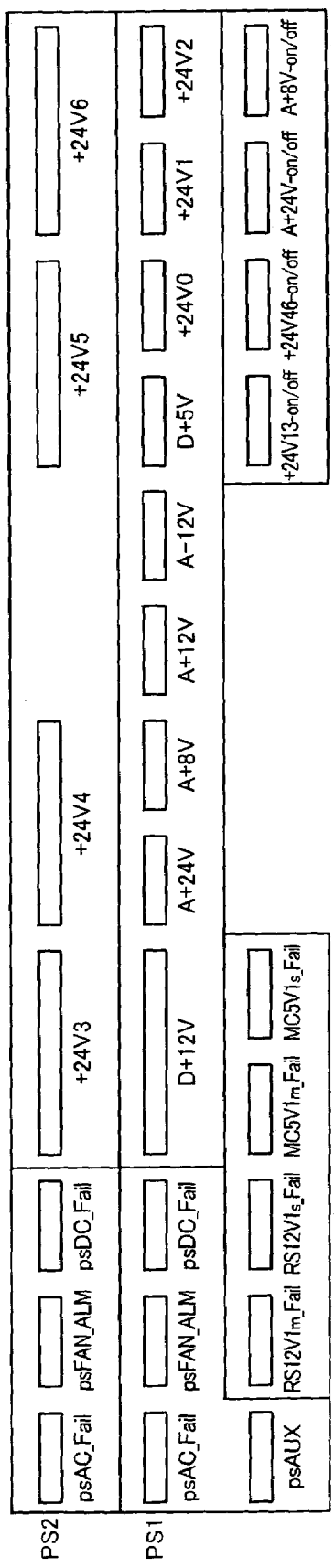
FIG. 8 is a schematic diagram showing a display state in the first status indicator circuit.

In the state where the AC power supply voltage is not applied to the switching power supplies 28 and 30, all the DC power supply voltages and auxiliary power supply voltages are not output from the switching power supplies 28 and 30. In this case, as shown in FIG. 8, the image recording device 10 is not operated, so all the LEDs of the first status indicator circuit 34 are turned off.

Upon application of the AC power supply voltage, the power supply voltages D+12V, A+12V, A−12V, D+5V, and +24V0 are output from the switching power supplies 28 and 30. These power supply voltages correspond to those output from the switching power supply 28 without condition upon application of the AC power supply voltage. These power supplies are supplied to the control/distribution board 32 so as to be further divided. The power supplies divided by the control/distribution board 32 are further supplied to the exposure control board 18, the mechanical control board 20, and the like. As a result, the sections in the control/distribution board 32, the exposure control board 18, the mechanical control board 20, and the like, which do not need any other power supply voltage, can be rendered operational.

Moreover, upon application of the AC power supply voltage, the auxiliary power supply voltages psAUX are output from the switching power supplies 28 and 30. The auxiliary power supply voltages psAUX are supplied to the first status indicator circuit 34 so as to render the first status indicator circuit 34 operational. Furthermore, upon application of the AC power supply voltage, the fail signals of the AC power supply voltages psAC_Fail, the alarm signals of the cooling fans psFAN_ALM, and the fail signals of the DC outputs psDC_Fail are also output. In this embodiment, the description is given supposing that all the fail signals are in a normal state until the activation of the power supply controller 22 is completed.

Figure 9:
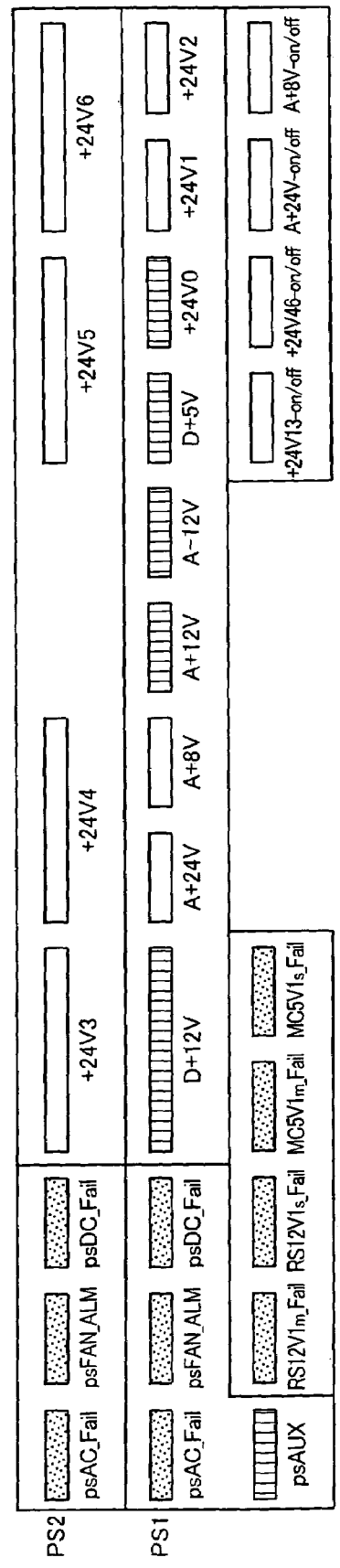
FIG. 9 is a schematic diagram showing a display state in the first status indicator circuit.

At this time, as shown in FIG. 9, the LEDs corresponding to the power supply voltages D+12V, A+12V, A−12V, D+5V and +24V0, and the auxiliary power supply voltage psAUX emit green light on the first status indicator circuit 34. On the other hand, the LEDs corresponding to the fail signals of the AC power supply voltages psAC_Fail, the alarm signals of the cooling fans psFAN_ALM, and the fail signals of the DC outputs psDC_Fail emit orange light.

Subsequently, ON-state signals are almost simultaneously output from the mechanical control board 20 as the ON/OFF control signals +24V46-on/off and +24V13-on/off so as to be input to the control/distribution board 32.

When the ON-state signal is input to the control/distribution board 32 as the ON/OFF control signal +24V46-on/off, the power supply voltages +24V4, +24V5 and +24V6 are output from the switching power supply 30. The power supply voltage +24V5 is an interlock system power supply voltage, which render interlock control effective. At this time, as shown in FIG. 10A, the LEDs corresponding to the ON/OFF control signal +24V46-on/off and the power supply voltages +24V4, +24V5 and +24V6 emit yellow light on the first status indicator circuit 34.

In addition, when the ON-state signal is input to the control/distribution board 32 as the ON/OFF control signal +24V13-on/off, the power supply voltages +24V1 and +24V2 are output from the switching power supply 28, and the power supply voltage +24V3 is output from the switching power supply 30. At this time, as shown in FIG. 10B, the LEDs corresponding to the ON/OFF control signal +24V13-on/off and the power supply voltages +24V1, +24V2 and +24V3 emit yellow light on the first status indicator circuit 34.

Subsequently, ON-state signals are almost simultaneously output from the exposure control board 18 as the ON/OFF control signals A+8V-on/off and A+24V-on/off so as to be input to the control/distribution board 32.

Figure 11A:
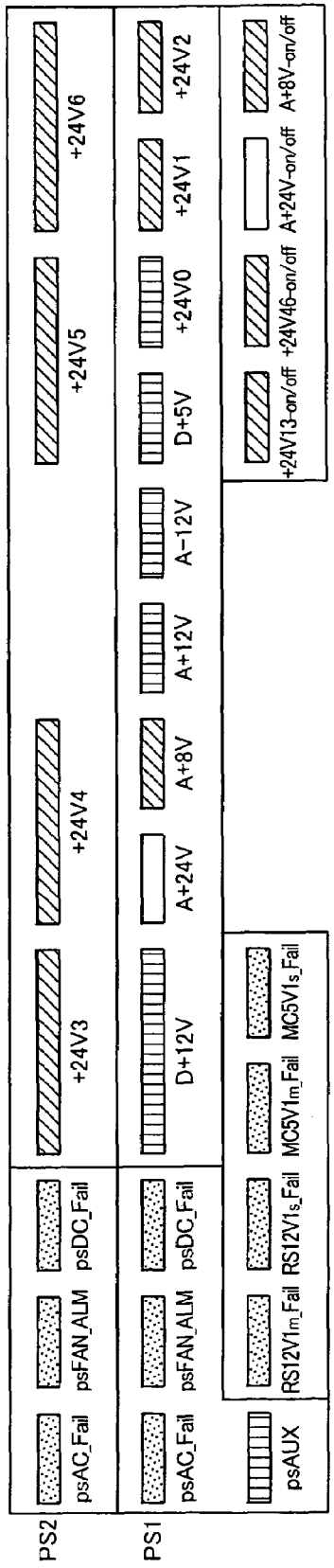
FIGS. 11A and 11B are schematic diagrams, each showing a display state in the first status indicator circuit.

When the ON-state signal is input to the control/distribution board 32 as the ON/OFF control signal A+8V-on/off, the power supply voltage A+8V is output from the switching power supply 28. At this time, as shown in FIG. 11A, the LEDs corresponding to the ON/OFF control signal A+8V-on/off and the power supply voltage A+8V emit yellow light on the first status indicator circuit 34.

Figure 11B:
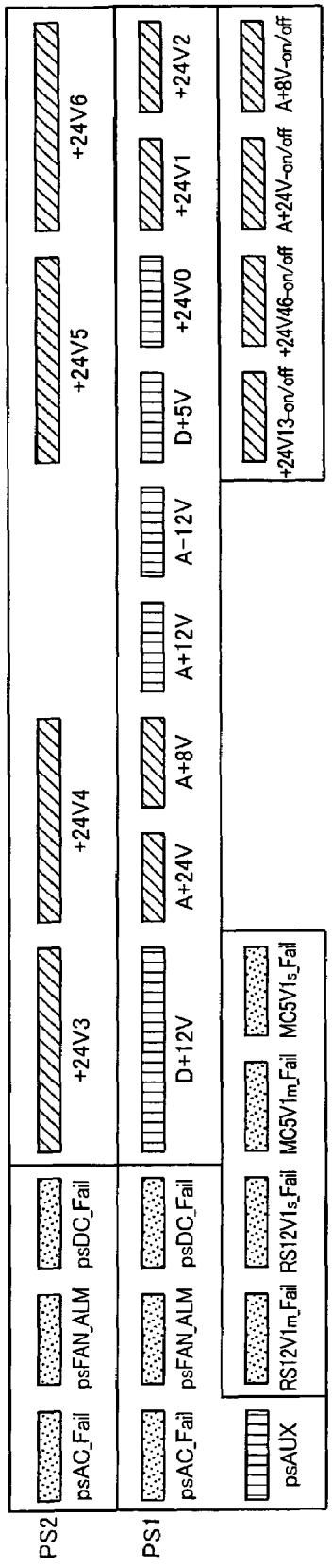

In addition, when the ON-state signal is input to the control/distribution board 32 as the ON/OFF control signal A+24V-on/off, the power supply voltage A+24V is output from the switching power supply 28. At this time, as shown in FIG. 11B, the LEDs corresponding to the ON/OFF control signal A+24V-on/off and the power supply voltage A+24V emit yellow light on the first status indicator circuit 34.

The above-mentioned power supply voltages A+8V and A+24V are power supply voltages for controlling the laser light sources of the exposure unit 12.

The operation of the power supply controller 22 upon activation is completed in the above-mentioned manner.

Specifically, in the exposure control board 18, the power supply voltages A+12V and A−12V are output, so the corresponding LEDs are lighted as shown in FIG. 12A. At the same time, when the fail signals RS12V1m_Fail and RS12V1s_Fail are brought into a normal state, so the corresponding LEDs are lighted (an AND condition between the power supply voltages A+12V and A−12V and the fail signals RS12V1m_Fail and RS12V1s_Fail), and the ON/OFF control signal A+24V-on/off is brought into an ON state so as to light the corresponding LED. Then, the power supply voltage A+24V is output so as to light the corresponding LED. On the other hand, when the ON/OFF control signal A+24V-on/off is brought into an OFF state so as to turn off the corresponding LED, the output of the power supply voltage A+24V is stopped so as to turn off the corresponding LED (an OR condition between the fail signals RS12V1m_Fail and RS12V1s_Fail and the ON/OFF control signal A+24V-on/off). Moreover, when the ON/OFF control signal A+8V-on/off is brought into an ON state so as to light the corresponding LED, the power supply voltage A+8V is output so as to light the corresponding LED. On the other hand, when the ON/OFF control signal A+8V-on/off is brought into an OFF state so as to turn off the corresponding LED, the output of the power supply voltage A+8V is stopped so as to turn off the corresponding LED (an OR condition between the fail signals RS12V1m_Fail and RS12V1s_Fail, and the ON/OFF control signal A+8V-on/off).

Similarly, in the mechanical control board 20, the power supply voltage D+5V is output, so the corresponding LED is lighted as shown in FIG. 12B. At the same time, when the fail signals MC5V1m_Fail and MC5V1s_Fail are brought into a normal state, so the corresponding LEDs are lighted (an AND condition between the power supply voltage D+5V and the fail signals MC5V1m_Fail and MC5V1s_Fail), and the ON/OFF control signal +24V13-on/off is brought into an ON state so as to light the corresponding LED. Then, the power supply voltages +24V1 to +24V3 are output so as to light the corresponding LEDs. On the other hand, when the ON/OFF control signal +24V13-on/off is brought into an OFF state so as to turn off the corresponding LED, the outputs of the power supply voltages +24V1 to +24V3 are stopped so as to turn off the corresponding LEDs (an OR condition between the fail signals MC5V1m_Fail and MC5V1s_Fail and the ON/OFF control signal +24V13-on/off). Moreover, when the ON/OFF control signal +24V46-on/off is brought into an ON state so as to light the corresponding LED, the power supply voltages +24V4 to +24V6 are output so as to light the corresponding LEDs. On the other hand, when the ON/OFF control signal +24V46-on/off is brought into an OFF state so as to turn off the corresponding LED, the outputs of the power supply voltages +24V4 to +24V6 are stopped so as to turn off the corresponding LEDs (an OR condition between the fail signals MC5V1m_Fail and MC5V1s_Fail, and the ON/OFF control signal +24V46-on/off).

Although the operation of the power supply controller 22 upon activation in this embodiment has been described above, the operation of the power supply controller upon activation according to the present invention is not limited thereto. Moreover, the following operation upon occurrence of a failure is a mere example, and therefore the operation is not limited thereto.

Next, a display state of the first status indicator circuit 34 will be described with the operation of the power supply controller 22 upon occurrence of a failure. First, the operation in the case where a failure occurs in the power supply of the mechanical control board 20 will be described as an example.

Figure 13:
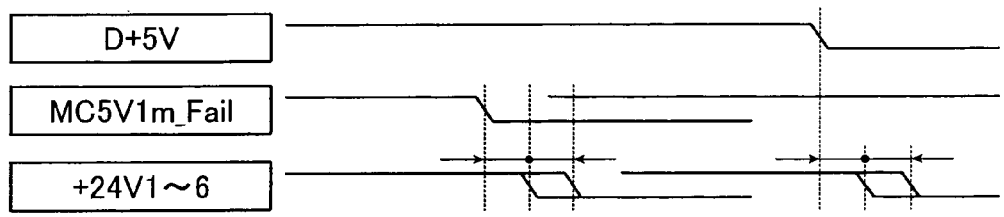
FIG. 13 is a timing chart showing an operation in the case where a failure occurs in a power supply of the mechanical control board.

FIG. 13 is a timing chart showing an operation in the case where a failure occurs in the power supply of the mechanical control board. In the timing chart shown in FIG. 13, the power supply voltage D+5V is output from the switching power supply 28 without condition upon application of the AC power supply voltage, as shown in FIG. 9. The power supply voltage D+5V is then supplied to the mechanical control board 20 through the control/distribution board 32. Moreover, the fail signal MC5V1m_Fail (the main power supply voltage) is output from the mechanical control board 20 so as to be fed back to the control/distribution board 32.

As shown in the timing chart of FIG. 13, when a signal in an abnormal state (at a low level in the timing chart) is fed back to the control/distribution board 32 as the fail signal MC5V1m_Fail, for example, the control/distribution board 32 recognizes the occurrence of a failure in the power supply of the mechanical control board 20 so as to stop outputting the power supply voltages +24V1 and +24V2 from the switching power supply 28, and to stop outputting the power supply voltages +24V3 to +24V6 from the switching power supply 30.

Figure 14:
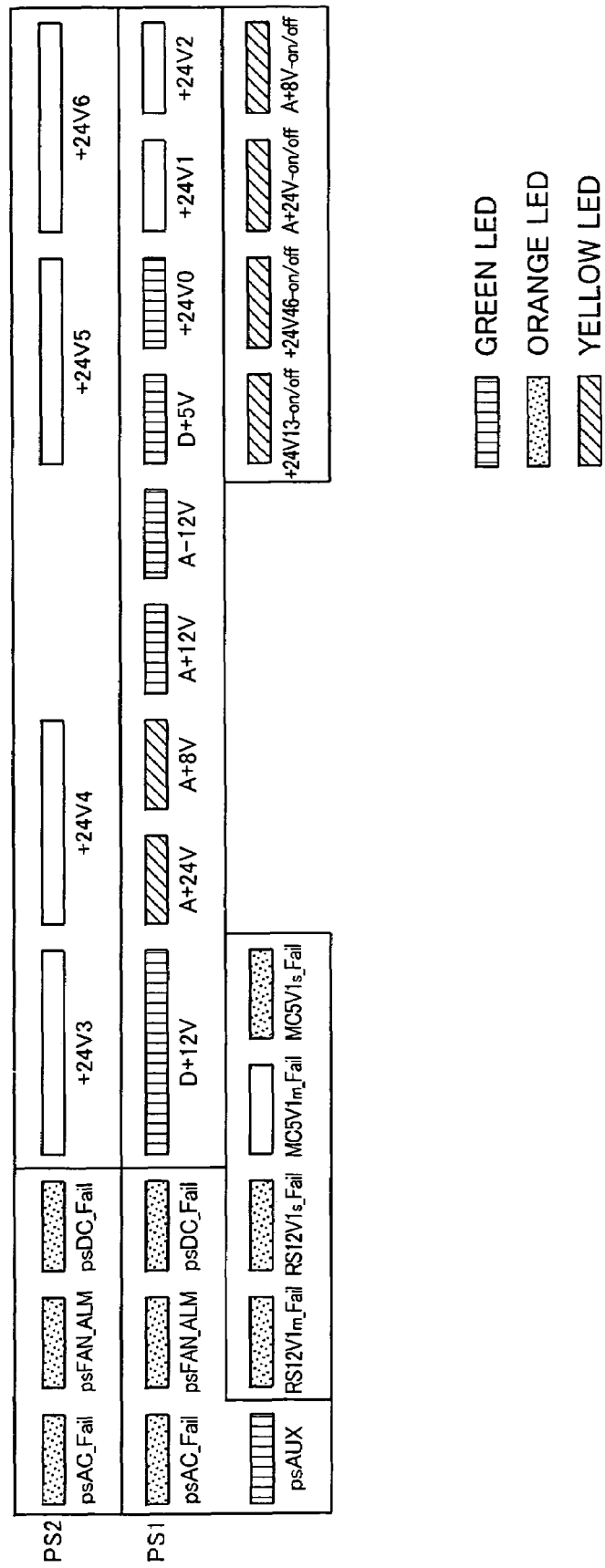
FIG. 14 is a schematic diagram showing a display state in the first status indicator circuit.

At this time, the LED corresponding to the fail signal MC5V1m_Fail is turned off on the first status indicator circuit 34 as shown in FIG. 14. Moreover, the LEDs corresponding to the power supply voltages +24V1 to +24V6 are turned off regardless of the statuses of the ON/OFF control signals +24V13-on/off and +24V46-on/off.

Even when a signal in an abnormal state (at a low level in the timing chart) is supplied to the mechanical control board 20 as the power supply voltage D+5V, the control/distribution board 32 operates in the same manner as in the case where a signal in an abnormal state is fed back as the fail signal MC5V1m_Fail.

The power supply voltages +24V1 to +24V6 are power supply voltages supplied to the respective mechanical components of the mechanical unit 14. When a failure occurs in the power supply of the mechanical control board 20 serving to control the operation of the mechanical unit 14, there is a high possibility that the mechanical control board 20 is in such a state that it cannot control the mechanical unit 14. Therefore, by stopping the output of the power supply voltages +24V1 to +24V6 supplied to the mechanical unit 14, the mechanical unit 14 can be prevented from becoming out of control to cause runaway so as to ensure the safety of the entire image recording device 10.

The power supply controller 22 recognizes the occurrence of a failure by a hardware circuit without depending on a software and accordingly performs a process of stopping the power supply voltage output or the like. Therefore, a process to be performed (stopping the power supply voltage output and the like) can be ensured when a failure occurs.

Next, an operation in the case where a failure occurs in a power supply of the exposure control board 18 will be described.

Figure 15:
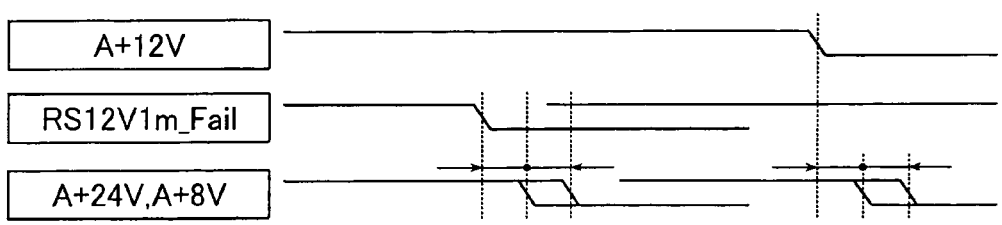
FIG. 15 is a timing chart showing an operation in the case where a failure occurs in a power supply of the exposure control board.

FIG. 15 is a timing chart showing an operation in the case where a failure occurs in a power supply of the exposure control board. In the timing chart shown in FIG. 15, the power supply voltage A+12V is output from the switching power supply 28 without condition upon application of the AC power supply voltage, as shown in FIG. 9. The power supply voltage A+12V is then supplied to the exposure control board 18 through the control/distribution board 32. Moreover, the fail signal RS12V1m_Fail (the main power supply voltage) is output from the exposure control board 18 so as to be fed back to the control/distribution board 32.

As shown in the timing chart of FIG. 15, when a signal in an abnormal state (at a low level in the timing chart) is fed back to the control/distribution board 32 as the fail signal RS12V1m_Fail, the control/distribution board 32 recognizes the occurrence of a failure in the power supply of the exposure control board 18 so as to stop outputting the power supply voltages A+24V and A+8V, that is, to stop outputting the power supply voltages for controlling the laser light sources from the switching power supply 28.

Figure 16:
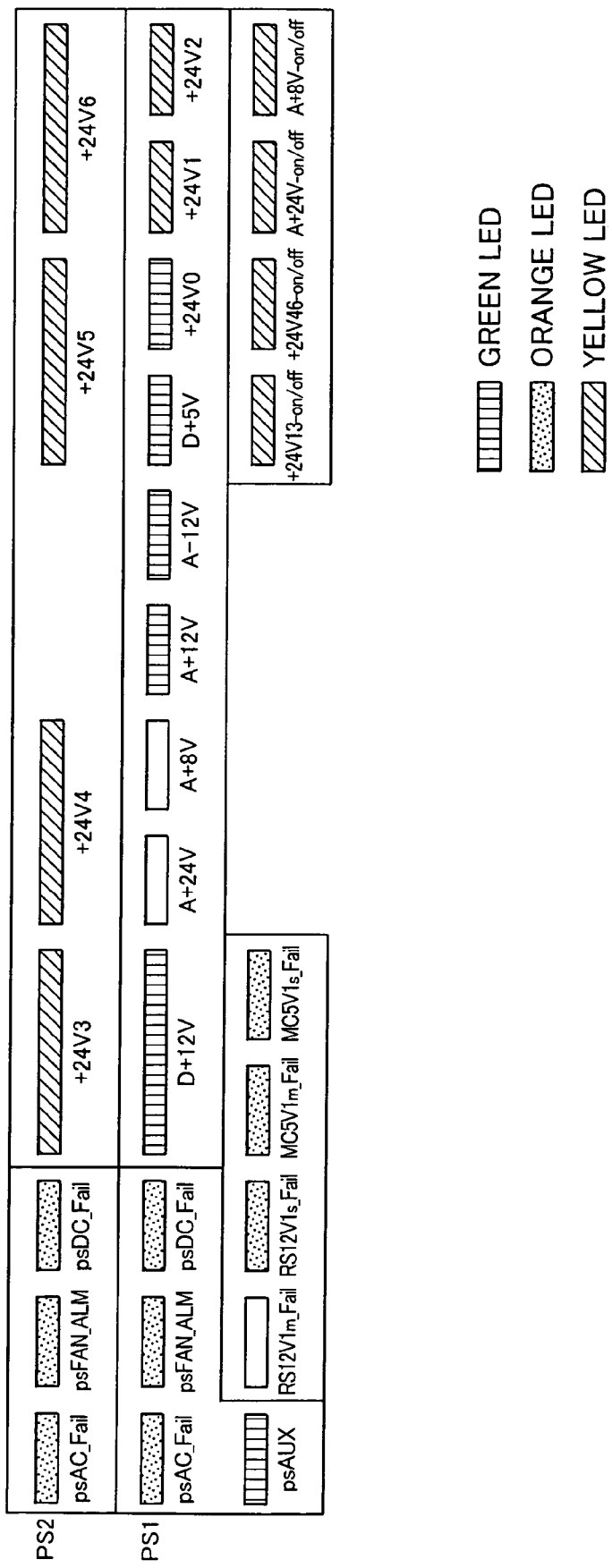
FIG. 16 is a schematic diagram showing a display state in the first status indicator circuit.

At this time, the LED corresponding to the fail signal RS12V1m_Fail is turned off on the first status indicator circuit 34 as shown in FIG. 16. Moreover, the LEDs corresponding to the power supply voltages A+24V and A+8V are turned off regardless of the statuses of the ON/OFF control signals A+24V-on/off and A+8V-on/off.

When a signal in an abnormal state (at a low level in the timing chart) is supplied to the exposure control board 18 as the power supply voltage A+12V, the output of both the main power supply voltage and the sub-power supply voltage from the exposure control board 18 is stopped. Therefore, in addition to the operation in the case where the signal in an abnormal state is fed back to the control/distribution board 32 as the fail signal RS12V1m_Fail, the LED corresponding to the fail signal RS12V1s_Fail is turned off.

As described above, the power supply voltages A+24V and A+8V serve to control the laser light sources of the exposure unit 12. If a failure occurs in the power supply of the exposure control board 18 for controlling the operation of the exposure unit 12, there is a high possibility that the exposure control board 18 is in such a state that it cannot control the exposure unit 12. Therefore, by stopping the output of the power supply voltages A+24V and A+8V, the exposure unit 12 can be prevented from becoming out of control to cause runaway so as to ensure the safety of the entire image recording device 10.

Moreover, as described above, the power supply controller 22 can recognize the occurrence of a failure if the failure occurs in a power supply system. Therefore, if a failure occurs only in the exposure control board 18 while the mechanical control board 20 normally operates, photographic paper being printed with a problem can be ejected at that time. Therefore, after the image recording device 10 is restored to a normal state, the image being processed at the time when the failure occurs can be reprinted. Thus, a photo print having a problem can be prevented from being made.

Moreover, since the power supply controller 22 can recognize the occurrence of a failure in the power supply system, the power supply controller 22 is capable of properly coping with a failure occurring in various conditions, for example, a failure occurring during printing and a failure occurring during the communication between the image recording device and its input device and the like. Herein, the input device is a control device for, for example, reading image data recorded on a transparent copy or a reflection copy so as to generate image data or performing various types of image processing on the image data so as to supply the processed data to the image recording device 10.

For the same reasons as those described above, in a photo print order station for receiving image data owned by a customer who orders making a photo print and then transmitting the image data to a server owned by a photo print maker through a network, the power supply controller 22 can properly cope with the failures such as a failure occurring during the communication between a cell phone storing the image data owned by the customer and the photo print order station, a failure occurring during readout of the image data from the recording medium, a failure occurring during image data transfer through a network.

Similarly, in the photo print order station having a self-print function for receiving image data owned by a customer to make a photo print, it is possible to properly cope with a failure occurring during the communication between a cell phone and the photo print order station having a self-print function, a failure occurring during readout of the image data from the recording medium, a failure occurring during printing, and the like. Furthermore, even in a writing device to a recording medium such as a CD-R, a failure occurring during writing to the recording medium and the like can be properly coped with.

The use of the power supply controller according to the present invention is not limited to those for the digital photo printer, the photo print order station, the photo print order station having a self-print function, the writing device to the recording medium of image data, and the like. The power supply controller according to the present invention can be used for various devices, each including: a power supply; and at least one component and at least one control board for controlling an operation of each of the components, which are operated by the power supply voltage supplied by this power supply.

The present invention is basically as described above.

Although the power supply controller according to the present invention has been described above in detail, the present invention is not limited to the above-described embodiment. It is apparent that various modifications and changes are possible as long as they do not depart from the gist of the present invention.

What is claimed is:

1. A power supply controller used in a device including: at least one component; and at least one control board for controlling an operation of each of said at least one component, said power supply controller including: a power supply section; and a power supply board for independently supplying a power supply voltage supplied from said power supply section to each of said at least one component and each of said at least one control board, wherein said power supply board includes an output control circuit for independently controlling to output and to stop outputting the power supply voltage supplied to each of said at least one component from said power supply board based on a signal indicating any one of a normal state and an abnormal state of the power supply voltage used in each of said at least one control board, the signal being fed back to said power supply board from each of said at least one control board when the power supply voltage is supplied to each of said at least one control board from said power supply board.

2. The power supply controller according to claim 1, wherein said power supply board further includes a first status indicator circuit operated by an auxiliary power supply voltage constantly output from said power supply section independently of the power supply voltage supplied from said power supply section, said first status indicator circuit being for indicating various statuses in the device, the statuses including a state of a signal indicating any one of a normal state and an abnormal state of the power supply voltage used in each of said at least one control board.

3. The power supply controller according to claim 2, wherein said first status indicator circuit indicates various statuses in said device in a different color for each of predetermined categories.

4. The power supply controller according to claim 2, wherein said device is an image recording device including, as said at least one component: an exposure unit for exposing a recording medium to light in accordance with image data; at least one mechanical component unit including carrier means of the recording medium; and a developing unit for developing the recording medium exposed to light by said exposure unit, and including, as said at least one control board: an exposure control board for controlling an operation of the exposure unit; and at least one mechanical component control board for controlling an operation of each of said at least one mechanical component unit and said developing unit, said image recording device being for outputting a photo print obtained from an image in accordance with the image data recorded on the recording medium.

5. The power supply controller according to claim 2, wherein each of said at least one control board includes a power supply voltage generating circuit for generating an internal power supply voltage used in each of said at least one control board from the power supply voltage supplied from said power supply board, and each of said at least one control board feeds back the internal power supply voltage and the power supply voltage supplied from said power supply board as the signal indicating any one of the normal state and the abnormal state of the power supply voltage.

6. The power supply controller according to claim 2, wherein said power supply board divides the power supply voltage supplied from said power supply section into a plurality of power supply voltages at various voltages so as to independently supply each of the plurality of power supply voltages at various voltages after the division to each of said at least one component and each of said at least one control board.

7. The power supply controller according to claim 6, wherein said power supply board further includes a second status indicator circuit for indicating statuses of the plurality of power supply voltages at various voltages after the division.

8. The power supply controller according to claim 7, wherein said second status indicator circuit indicates the statuses of the plurality of power supply voltages at various voltages after the division in a different color for each of predetermined categories.

9. The power supply controller according to claim 7, wherein said second status indicator circuit includes a plurality of light-emitting elements for emitting light of different colors, and emitted-light color information indicating an emitted-light color of each of said light-emitting elements even during extinction is written on a board of said second status indicator circuit.

10. The power supply controller according to claim 2, wherein said power supply board further includes an ON/OFF control circuit, wherein said ON/OFF control circuit controls to output and to stop outputting the power supply voltage supplied from said power supply section based on an ON/OFF control signal for controlling to output and to stop outputting the power supply voltage, the ON/OFF control signal being input from each of said at least one control board to said power supply board when the signal indicating any one of the normal state and the abnormal state of the power supply voltage indicates the normal state, whereas said ON/OFF control circuit stops outputting the power supply voltage supplied from said power supply section regardless of a state of the ON/OFF control signal when the ON/OFF control signal indicates the abnormal state.

11. The power supply controller according to claim 10, wherein each of said at least one control board includes: a power supply ON/OFF control i/f circuit for outputting the ON/OFF control signal for controlling to output and to stop outputting the power supply voltage supplied from said power supply board to each of said at least one control board; and a power supply failure state detection circuit for detecting a failure in a power supply of each of said at least one control board to output the signal indicating any one of the normal state and the abnormal state of the power supply.

12. A power supply controller used in a device including: at least one component; and at least one control board for controlling an operation of each of said at least one component, said power supply controller including: a power supply section; and a power supply board for independently supplying a power supply voltage supplied from said power supply section to each of said at least one component and to each of said at least one control board, wherein said power supply board includes a first status indicator circuit operated by an auxiliary power supply voltage constantly output from said power supply section independently of the power supply voltage supplied from said power supply section, said first status indicator circuit being for indicating various statuses in said device including a state of a signal indicating any one of a normal state and an abnormal state of the power supply voltage used in each of said at least one control board, the signal being fed back to said power supply board from each of said at least one control board when the power supply voltage is supplied to each of said at least one control board from said power supply board.

13. The power supply controller according to claim 12, wherein said first status indicator circuit indicates various statuses in said device in a different color for each of predetermined categories.

14. The power supply controller according to claim 12, wherein said device is an image recording device including, as said at least one component: an exposure unit for exposing a recording medium to light in accordance with image data; at least one mechanical component unit including carrier means of the recording medium; and a developing unit for developing the recording medium exposed to light by said exposure unit, and including, as said at least one control board: an exposure control board for controlling an operation of the exposure unit; and at least one mechanical component control board for controlling an operation of each of said at least one mechanical component unit and said developing unit, said image recording device being for outputting a photo print obtained from an image in accordance with the image data recorded on the recording medium.

15. The power supply controller according to claim 12, wherein said power supply board divides the power supply voltage supplied from said power supply section into a plurality of power supply voltages at various voltages so as to independently supply each of the plurality of power supply voltages at various voltages after the division to each of said at least one component and each of said at least one control board.

16. The power supply controller according to claim 15, wherein said power supply board further includes a second status indicator circuit for indicating statuses of the plurality of power supply voltages at various voltages after the division.

17. The power supply controller according to claim 16, wherein said second status indicator circuit indicates the statuses of the plurality of power supply voltages at various voltages after the division in a different color for each of predetermined categories.

18. The power supply controller according to claim 16, wherein said second status indicator circuit includes a plurality of light-emitting elements for emitting light of different colors, and emitted-light color information indicating an emitted-light color of each of said light-emitting elements even during extinction is written on a board of said second status indicator circuit.

* * * * *